Oct. 3, 1933.  C. G. STRANDLUND ET AL  1,928,954
CULTIVATOR
Filed July 22, 1929  4 Sheets-Sheet 3
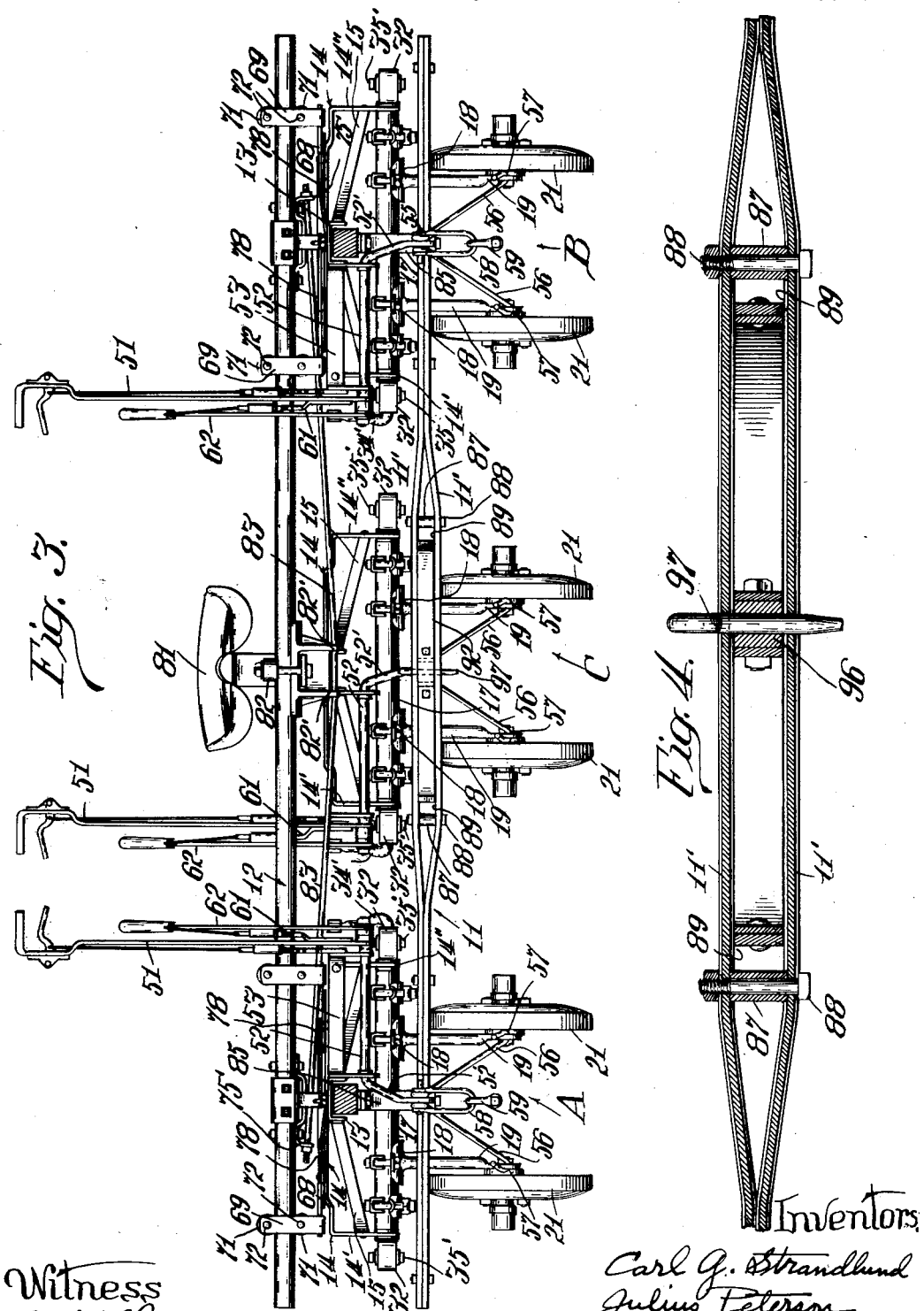

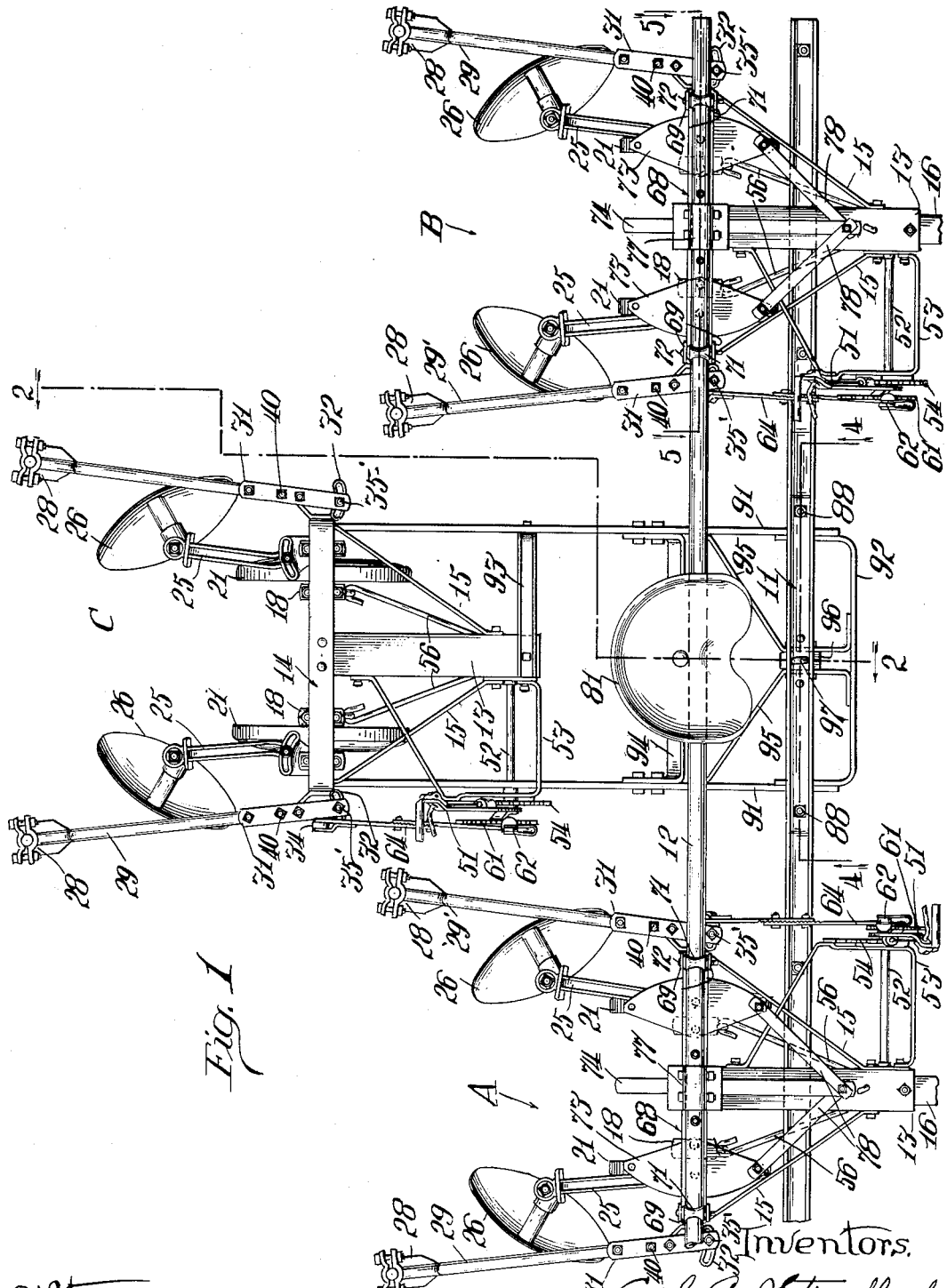

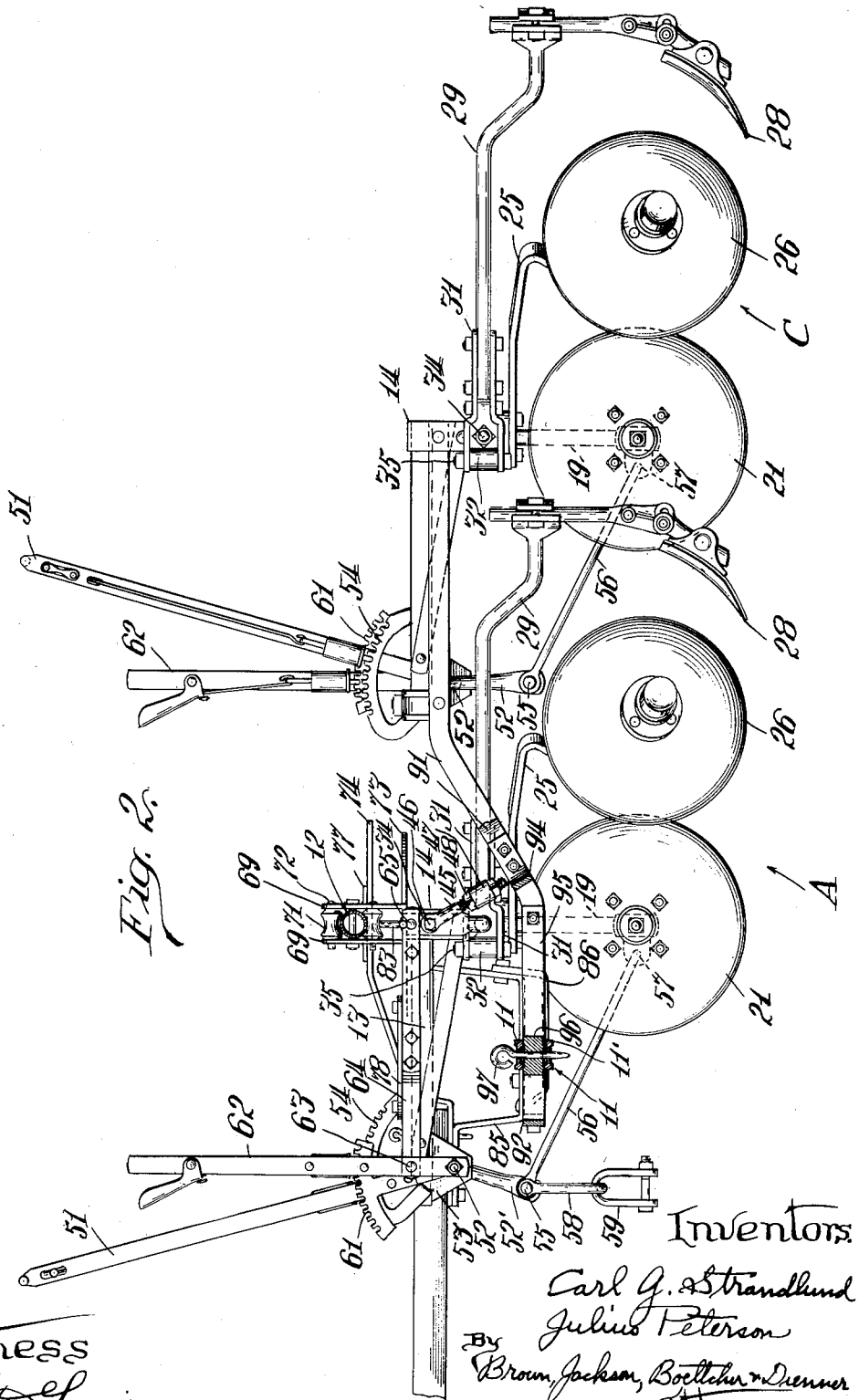

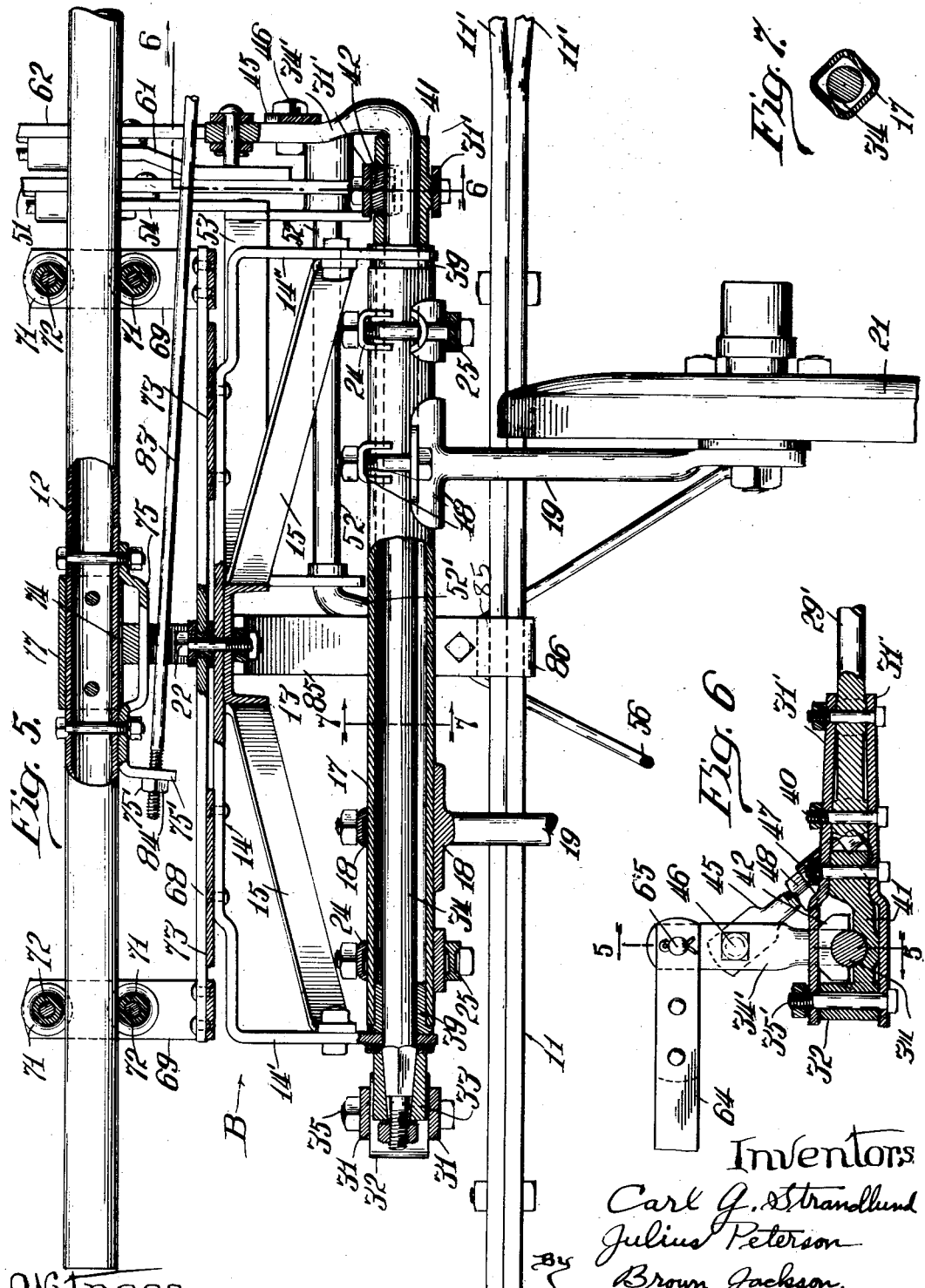

Patented Oct. 3, 1933

1,928,954

UNITED STATES PATENT OFFICE 1,928,954

CULTIVATOR

Carl G. Strandlund and Julius Peterson, Moline, Ill., assignors to Deere & Company, Moline, Ill., a corporation of Illinois Application July 22, 1929. Serial No. 379,931

26 Claims. (Cl. 97—143)

The present invention relates to lister cultivators of the multiple-row type. In the construction which we are about to describe there are provided three cultivator gangs for cultivating three plant rows, and, as will hereinafter appear, certain features of the invention have particular application to this three-row type of implement, whereas other features are applicable to cultivators designed for cultivating any number of rows.

In these lister cultivators, each cultivator gang associated with each plant row functions very much as an independent unit, having its own supporting wheels, its own combination of cultivating tools, and its own arrangement of lifting and depth adjusting controls.

The several gangs making up the implement are all coupled together for draft purposes, but the coupling therebetween is flexible so as to permit the gangs to rise and fall and swing laterally independently of each other so as to permit the gangs to follow deviations in their individual plant rows.

One of the features of the invention is directed to the provision of new and improved mechanism for raising and lowering the cultivating tools of each gang. These tools frequently comprise a pair of cultivating disks or like devices traveling on opposite sides of the plant row for turning the soil inwardly or outwardly, together with a pair of cultivating shovel rigs also traveling on opposite sides of the plant row, but usually disposed in rear of the cultivating disks. The disks and shovels are generally disposed in rear of two supporting wheels which are located on opposite sides of the plant row, these wheels being usually mounted on swinging crank axles connected with the gang frame and by which the gang is raised and lowered. Heretofore, the cultivating tools have been so connected with these crank axles that as the latter are swung backwardly to raise the gangs the disks and the shovels are both caused to swing upwardly through the same degree of angular movement owing to the fact that the shovels are spaced rearwardly from the disks and swing through a longer radius it follows that in moving both through the same degree of angular movement the shovels must be raised to an unnecessary height before the disks sufficiently clear the ground.

The lifting of the cultivator shovels to this unnecessary height in making each turn at the end of the field requires an unnecessary amount of energy to operate the cultivator, disturbs relative depth adjustments between the disks and shovels in returning these tools to cultivating position, and is objectionable for other reasons.

By our present invention we have provided a mechanism which results in the disks and the shovels being swung upwardly through different angular distances, whereby the shovels are raised approximately the same height as the disks, thereby reducing the effort required in the repeated raising of the cultivating tools and avoiding the other objections stated. By thus moving the disks and shovels the same height these parts will always maintain the same vertical position relative to each other. This relation is maintained irrespective of the depth at which the implement is set to work. For example, if the disk is set to work at one depth and the shovel is set to work an inch deeper, raising the disk several inches by means of the master lever simultaneously raises the shovel to a position an inch lower than the disk.

Another feature of the invention resides in the manner in which draft is transmitted to the intermediate cultivator gang, and in the manner in which this intermediate gang is stabilized relatively to the two outer gangs to prevent lateral tipping of the intermediate gang. The construction disclosed permits this intermediate gang to be spaced rearwardly from the two outer gangs, and permits the intermediate gang to swing freely relatively to the outer gangs, while still holding the intermediate gang in stable equilibrium.

The two outer gangs are connected by a transverse stabilizing bar, and one of the features of the invention resides in the operating connection between these gangs and such stabilizing bar which permits inward and outward shifting movement of the two outer gangs relatively to each other.

Another feature of the invention resides in the provision of new and improved adjusting mechanism whereby one shovel support may be adjusted vertically relatively to its companion shovel support so that the two shovels can be quickly and easily adjusted for working at the same depth or at different depths.

Other features and objects of the invention will appear from the following description of a preferred embodiment thereof. In the accompanying drawings illustrating such embodiment:

Figure 1 is a plan view of the implement.

Figure 2 is a longitudinal sectional view through the implement, taken approximately on the plane of the line 2—2 of Figure 1.

Figure 3 is a front view of the implement.

Figure 4 is a sectional view through the transverse draft bar, as represented by the section plane 4—4 of Figure 1.

Figure 5 is a transverse sectional view on a larger scale through one of the outer gangs, as represented by the section plane 5—5 of Figure 1, this section looking forwardly, and also corresponding to a section on the line 5—5 of Figure 6.

Figure 6 is a sectional view on the plane of the line 6—6 of Figure 5, illustrating the means for obtaining relative adjustment between the shovel supporting arms, and Figure 7 is a detail sectional view taken on the plane of the line 7—7 of Figure 5.

The implement comprises three lister cultivator gangs, the two outwardly disposed gangs being designated A and B, and the intermediate or center gang being designated C. The two laterally disposed gangs A and B are substantially duplicates, with the exception that one is a left hand unit and the other a right hand unit. The intermediate gang C is generally similar in construction to the two outer gangs A and B, differing therefrom, however, in the manner of establishing the draft connection with the intermediate gang, and in the fact that such intermediate gang has no draft pole, as will hereinafter appear. Accordingly, we shall only describe one of these gangs in detail, and in this regard, it may be remarked that the construction of these gangs, and the construction of the entire implement, embodies certain improvements over the three-row lister cultivator disclosed in the application of Walter H. Silver, Serial No. 228,118, filed October 24, 1927.

Extending transversely of the implement is a draft bar 11 and a stabilizing bar 12. As described in the above mentioned Silver application, this implement is adapted to be drawn either by four horses or six horses, depending upon soil conditions, etc. When a six horse draft is used the triple trees are connected with the draft bar 11, and when a four horse draft is used the double trees are connected directly with the two laterally disposed gangs A and B. With either type of draft, the intermediate gang C receives its draft pull through the transverse draft bar 11, as will be hereinafter described in greater detail. The two laterally disposed gangs A and B are maintained in stable equilibrium by the transverse stabilizing bar 12, relatively to which these gangs can swing laterally in following deviations in their plant rows.

Referring now to the detail construction of the gang B, by way of example, will be seen from Figures 1 and 5 that the frame structure thereof comprises a longitudinally extending inverted channel bar 13 and a transversely extending U-shaped bar 14 rigidly secured thereto and having depending side arms 14′, 14″ (Figure 5). Diagonal brace bars 15 are secured at their front ends to the front portion of the channel 13 (Figure 1), and at their rear ends are secured to the depending side arms 14′, 14″ (Figure 5).

Extending forwardly from the front end of the channel bar 13 is a draft pole 16, the channel bar forming a socket in which the pole is rigidly secured by suitable bolts, it being understood that the other lateral gang A has a similar draft pole 16 extending forwardly therefrom. Extending transversely between the depending arms 14′ and 14″ is a tube or sleeve 17 which can be rocked axially about suitable bearings carried by said depending arms. Secured to this sleeve at laterally placed points by suitable clamping yokes 18 are downwardly extending wheel supports 19 on the lower ends of which the two supporting wheels 21 of the gang are journaled. These wheels straddle the plant row being cultivated by that particular gang, and it will be seen that these wheels support the frame structure just described comprising the sleeve 17, U-shaped frame bar 14 and channel bar 13. Axial oscillation of the sleeve 17 obviously serves to swing the wheels 21 either to the position shown in Figure 2, at which time the gang is raised to inoperative position, or to a forwardly disposed position, at which time the gang is lowered for bringing the cultivating tools down into engagement with the ground. The frame structure just described can swivel horizontally about the axis of a pivot bolt 22 (Fig. 5) in the steering of the gangs, and can also travel inwardly or outwardly along the stabilizing bar 12 when the two outer gangs converge or separate in following deviations in their plant rows, all of which will be presently described.

Fixedly secured to the end portions of the sleeve 17 by clamping yokes 24 are rearwardly extending arms 25 which carry the two cultivating disks 26 traveling on each side of the plant row. As shown in Figure 7, the sleeve 17 is preferably of square or polygonal cross section to hold the clamping yokes 18 and 24 securely on the sleeve against relative rotation. Preferably, the disk supporting arms 25 have swiveled attachment to their upper and lower yoke members 24 whereby these arms can be angularly adjusted horizontally for placing the two cultivating disks 26 in close proximity to the plant row or relatively far from the plant row. The mounting of the disks on the rear ends of the arms 25 is of an adjustable type permitting vertical adjustment of the disks relatively to the arms, and the disks are reversible either for turning the soil inwardly toward the plant row or outwardly away from the plant row, as is well understood by those skilled in the art. It will be seen from the foregoing that the disk supporting arms 25 swing through the same angular movement as the wheel supports 19, i. e., when the wheel supports are swung forwardly around the axis of the sleeve 17 the arms 25 swing downwardly through the same angular movement, and when the wheel supports are swung backwardly for raising the gang the arms 25 are also swung upwardly through this same angular movement in lifting the disks to the inoperative position shown in Figure 2.

Associated with each gang are two or more cultivator shovels 28 which are located on opposite sides of the plant row and are disposed a suitable distance in rear of the disks 26, as shown in Figure 2. These shovels have vertically adjustable mountings in the rear ends of arms 29, 29′ which are supported at their forward ends to swing concentrically at the axis of the sleeve 17. As best shown in Figure 1, the forward end of the outer arm 29 is secured between the plates 31 which extend across the upper and lower sides of bracket arms 32 extending from a hub 33 (Figure 5) which is fixedly secured on the end of a shaft 34 having rotatable bearing support within the sleeve 17. The two plates 31 of the arm 29 are pivoted for horizontal swinging movement about the rear bracket arm 32, and the front bracket arm is provided with an arcuate slot for receiving a bolt 35 extending down through the plates 31, whereby the arm 29 can be shifted laterally to any adjusted position and then rigidly clamped in this adjustment. The inner shovel supporting arm 29' can also be adjusted inwardly or outwardly relatively to the plant row in substantially the same manner. In addition, this inner supporting arm 29' can be tilted upwardly or downwardly relatively to the shaft 34 for securing different relative depth adjustments between the two shovels carried by the two arms 29 and 29'.

Before describing the mechanism by which this vertical adjustment is effected, it will be noted from Figure 5 that the shaft 34 has bearing support in openings in the depending frame arms 14', 14'' and that bushings 39 are interposed between the ends of the sleeve 17 and the shaft 34, these bushings having polygonal outer surfaces for receiving the sleeve and having cylindrical bores establishing rotatable bearing supports for the sleeve on the shaft. The inner end of said shaft is bent upwardly to form a crank arm 34' which has operative connection with the actuating mechanism through which the cultivating tools are raised and lowered. Referring to Figure 6, it will be noted that the forward end of the disk supporting arm 29' is also extended between two plates 31' where it is secured by bolts 40. The front ends of said plates extend above and below a split clamp mounted on the shaft 34 adjacent to the crank end 34' thereof. As shown in Figure 6, this clamp comprises a hub member 41 encircling the shaft and having an arcuate recess in the upper side thereof, in which recess an arcuate clamping block 42 is disposed. The plates 31' are bolted to the hub member 41, and at their front ends receive a bolt 35' by which these front ends can be drawn together for forcing the hub 41 and clamping block 42 into rigid clamping engagement with the shaft 34, after the disk supporting arm 29' has been adjusted to its desired vertical angle relatively to the shaft.

An adjustable tie link is also connected between the disk supporting arm and the crank arm 34' for maintaining these adjustments. Such comprises a link 45 which is pivotally connected at 46 to the crank arm 34'. The lower end of said link, which is threaded, extends through a boss 47 which projects as an integral extension from the hub member 41. Nuts 48 screw over the threaded portion of the link and engage the upper and lower ends of the boss 47, it being evident that loosening of these nuts and the screwing of the same upwardly or downwardly will change the angular position of the disk supporting arm 29' relatively to the shaft 34. The tightening of these nuts 48 establishes a positive link connection between the disk supporting arm and the crank arm 34', thus assisting the clamping hub 41 and block 42 in maintaining the desired adjustment of the disk supporting arm 29'. The link 45 passes through the boss 47 with sufficient play to accommodate the change in the angular position of the link relatively to the boss with different adjustments. From the description thus far, it will be seen that the disks 26 swing upwardly and downwardly directly with the swinging movement of the supporting wheels 21, and that the shovels 28 swing upwardly and downwardly about the same axis as the disks 26,—the shovels, however, responding to a rocking movement of the shaft 34, whereas the disks respond to rocking movement of the sleeve 17.

Referring now to the mechanism which effects the swinging of these cultivating tools, it will be seen from Figure 2 that each gang has a master depth adjusting and lifting lever 51, mounted on a shaft 52 carried by that gang. Referring to Figure 1, the shaft 52 is rotatively mounted in a U-shaped frame bracket 53 which is secured to the side of the longitudinal frame channel 13. Said lever is fixedly attached to the shaft 52, and is provided with a suitable latching dog adapted to engage in the teeth of a notched sector 54 which is stationarily mounted on the frame bracket 53. Extending downwardly from the outer end of the shaft 52 is a crank arm 52' carrying a pivot pin 55 at its lower end to which the front ends of link members 56 are coupled. These links diverge rearwardly and are pivotally connected at 57 to lugs extending forwardly from the wheel supporting standards 19. From the description thus far, it will be seen that stroking of the master lever 51 is operative through the crank arm 52' and links 56 to swing the wheel supporting standards 19 forwardly for lowering the gang or rearwardly for raising the gang, these wheel supporting standards forming in effect swinging crank axles for the two supporting wheels 21. When a four horse draft is employed the draft pull of each team is transmitted directly to each outer gang through a draft link 58 connected with opposite ends of the pivot pin 55. A clevis 59 connecting with the link 58 is, in this type of draft, adapted to be coupled with the doubletree of the team, the two horses of the team being on opposite sides of the pole 16 in this arrangement.

Also fixedly mounted on the shaft 52 to swing therewith is a latching sector 61 cooperating with an independent depth adjusting or lifting lever 62. This lever is rotatively mounted on the shaft 52, but when it is latched to its sector 61 it swings as a unit with the master lever 51. Pivotally connected to the secondary lever 62, at the pivot pin 63, is a link 64 which has its rear end pivotally connected with the crank arm 34' on a pivot pin 65. As shown in Figure 1, the link 64 consists of two overlapping sections having their opposing faces serrated and adapted to be clamped together by suitable bolts, whereby the effective length of the link 64 can be readily adjusted. By virtue of the operative connection established between the shafts 52 and 34 through the link 64 whenever the master lever 51 is stroked for swinging the disks 26 upwardly or downwardly the shaft 34 is also oscillated for swinging the shovels 28 upwardly or downwardly. However, the degree of angular movement imparted to the sleeve 17 for swinging the disks 26 upwardly or downwardly is greater than the degree of angular movement imparted to the shaft 34 for swinging the shovels 28 upwardly or downwardly, and, consequently, notwithstanding the greater distance that the shovels are disposed from this concentric pivot axis, they are not lifted to an unnecessary height but only to a height approximating that of the disks 26. Hence it is not necessary to apply as much energy to the master lever 51 in the repeated raising of the cultivating tools at each end of the field.

The difference between the angular movement of the disks and the angular movement of the shovels follows from the proportioning of the radial distances of the pivots 55 and 57 relative to the pivots 63 and 65, and also with respect to the radial distances of the disks 26 and shovels 28 from their concentric pivotal axes. When it is desired to adjust the depth of the shovels 28 independently of the disks 26, or to shake trash out of the shovels, while the implement is in operation, the independent lever 62 is actuated for raising or lowering the shovels independently of the disks 26.

Each of the other gangs A and C has substantially the same arrangement of master and independent levers 51 and 62 for raising and lowering the cultivating tools, and each of these other gangs also has substantially the same arrangement of adjusting link 45 for establishing and maintaining different depth adjustments between the two shovel supporting arms 29, 29' of the gang.

Referring now to the manner in which each lateral gang A and B is connected with the transverse stabilizing bar 12, it will be seen from Figure 5 that the pivot bolt 22 connects the frame member 14 of each of these gangs with a bar or plate 68 which extends lengthwise of the stabilizing bar directly below the same. U-shaped brackets 69 are riveted to the ends of plate 68 and have arms extending upwardly on opposite sides of the stabilizing bar.

Rollers 71 are pivotally supported between these arms on suitable transverse pivot pins 72, the stabilizing bar 12 preferably being of cylindrical tubular section and the rollers 71 being of spool formation for rolling along the upward and lower sides of said bar. When the gang frame member 14 swivels around the pivot bolt 22, as in the steering of the implement, a stabilizing relation is nevertheless maintained between the frame member 14 and the end portions of the upper stabilizing frame 68 through the provision of segmental plates 73 which are secured to the bar 14 of the gang frame and which maintain bearing engagement with the underside of the upper frame member 68 in the different angular positions of the gang frame relatively to the stabilizing bar. This will be apparent from Figure 1, from which it will be seen that when the gang frame member 14 is turned at an angle to the stabilizing bar 12, the opposite end portions of the two segmental plates 73 remain in bearing engagement with the under side of the bar or plate 68 so that the gang frame is held against lateral tipping in these different angular positions. The two supporting wheels 21 of each gang must be located relatively close together, in which relation they do not afford a large degree of stability for the gang, and consequently reliance is placed upon the transverse stabilizing bar 12 for holding the two lateral gangs A and B upright in the different positions of the gangs.

The horizontal angle through which each of these gangs can swing relatively to the stabilizing bar is limited by a bar 74, which is bolted at its front end to the forward portion of the channel member 13. The rear portion of this bar extends through a guideway defined between the bottom of the stabilizing bar 12 and a U-shaped bracket 75, which is secured to the bottom of the stabilizing bar, as best shown in Figure 5. When the gang frame 14 is turned to a predetermined angle relatively to the stabilizing frame 68, the bar 74 engages the edges of the bracket 75 and prevents further angular movement of the gang. The roller mounting of the frame 14 on the stabilizing bar 12 provides for transverse shifting or sliding movement of each lateral gang relatively to the other gangs so that these lateral gangs can shift inwardly or outwardly in following deviations in their plant rows. The bar 74 also functions as a stop element for limiting this shifting movement, the limits being established by the engagement of this bar with the sides or ends of the bracket 75. The stabilizing bar is prevented from rotating on its axis by the engagement of the bar 74 in the bracket 75, and additional support is provided for preventing such axial rotation in the form of a U-shaped plate 77 which is secured over the upper side of the tubular stabilizing bar and has outwardly projecting flange extensions bearing down on the top of the limiting bar 74.

As shown in Figure 1, brace bars 78 extend between the forward ends of the segmental plates 73 and the front portion of the channel 13, such brace bars being shown as also connected with the front end of the limiting bar 74.

The operator's seat 81 is mounted on the center of the stabilizing bar 12 by any suitable clamping means 82. To reinforce said stabilizing bar against sagging a truss rod 83 is extended under the bar, with the intermediate portion of the truss spaced downwardly from the stabilizing bar by downwardly projecting extensions 82' on the seat clamping means 82. The ends of this truss rod extend through downwardly projecting extensions 75' at the ends of the brackets 75 (Figure 5), and receive nuts 84 bearing against said bracket extensions and establishing the desired tension in the truss rod.

The transverse draft beam 11 is constructed of upper and lower bars 11', 11', preferably of I-beam section, which are bolted together at different points along the length of the beam. The end portions of the draft beam have draft coupling with each lateral gang A and B through two plates 85 and 86 (Figure 2), which extend downwardly from the gang frame below the channel member 13. The lower portions of these two plates are spaced from each other to provide a guide opening through which the draft beam extends, this end portion of the beam having its two bars 11' contacting directly with each other, as shown in Figure 3.

The beam can slide transversely in the guide opening between the plates 85 and 86, thereby accommodating relative shifting movement between the beam and each lateral gang so that the gangs are free to follow their listed plant rows. If desired, vertical rollers may be provided between the plates 85 and 86 for engaging with the front and rear edges of the draft beam, as illustrated in the above mentioned Silver application.

Referring to Figures 3 and 4, it will be seen that at the central portion of the beam the two bars 11' are spaced vertically from each other by spacing sleeves 87 mounted on bolts 88. This defines a guide opening 89 in the beam, into which the frame of the intermediate gang C extends. This frame comprises two side bars 91 secured at their rear ends to the transverse bar 14 and having their front ends joined by a transverse bar 92. The front end of the channel member 13 is secured to one of these side bars by the cross strut 93, and a second cross strut 94 reinforces the intermediate portions of the side bars. The entire forward end of this frame structure extends through the guide opening 89 in the draft beam. Two diagonal bars 95 extending between the front and side portions of said frame support a coupling block 96 therebetween. A coupling pin 97 extends down thru aligned openings in the draft beam and in the block 96 for establishing a pivotal coupling between the draft beam and intermediate gang C.

It will be noted that this construction permits the intermediate gang to swing laterally relatively to the other gangs in following deviations in its plant row, and that by having the frame of this gang project forwardly through the guide opening 89, the gang is always held in stable relation by the draft beam irrespective of the angular position which this gang may assume relatively to the beam.

It will be seen from the foregoing that to adapt the implement to a four horse hitch, it is only necessary to couple the doubletrees of the teams to the clevis members 59 of the two outer cultivator units. In this arrangement the draft pull will be applied directly to the two outer gangs or units A and B, and will thence be transmitted through the transversely extending draft bar 12 for advancing the intermediate gang. Conversely, as described in the copending Silver application, when it is desired to adapt the implement to a six horse hitch it is only necessary to couple the tripletrees to the outer ends of the draft bar 11, in which relation two horses of each team will be on the outer side of the pole 16 and the third horse of the team on the inner side thereof. In this arrangement the draft pull will be applied directly to the ends of the draft bar 11 and will thence be transmitted to the two outer gangs A and B.

It will be noted that irrespective of whether the implement is arranged for a four horse hitch or for a six horse hitch, the draft bar and each outer cultivator gang are free to shift relatively to each other transversely of the implement, so that all three cultivator gangs are capable of independent transverse shifting movement for following deviations in their lister rows.

The operator from his seat 81 on the stabilizing bar 12 can readily reach the adjusting levers of all three gangs, either for raising all of the cultivating tools at the end of the field, through actuation of the levers 51, or for changing the depth adjustment of the shovels or shaking trash out of the same, through actuation of the levers 62.

While the construction which we have shown and described constitutes the preferred embodiment of our invention, it will be understood that such embodiment is merely exemplary and that numerous modifications and rearrangements may be made without departing from the essence of the invention.

We claim:

1. In a multiple row lister cultivator, the combination of a plurality of lister cultivator gangs each comprising a cultivating disk, a cultivating shovel, pivoted arms supporting said disk and shovel, an operating member for raising and lowering said disk and shovel, and means connecting said operating member with said arms, whereby said disk and shovel are raised and lowered at differential angular speeds and approximately the same distance from the ground in the actuation of said operating member.

2. In a multiple row lister cultivator, the combination of a plurality of lister cultivator gangs each comprising a cultivating disk, a cultivating shovel spaced rearwardly from said disk, a pair of arms supporting said disk and shovel and mounted for movement about a common axis, an operating member for raising and lowering said disk and shovel, and means connecting said operating member with said arms, whereby said disk and shovel are both raised approximately the same height in the actuation of said operating member.

3. In a lister cultivator, the combination of a frame, a wheel support pivoted thereto, a supporting wheel on said wheel support, an arm swinging substantially upon a center line common with said wheel support, a cultivating disk carried by said arm, a second arm movably connected with said frame, a cultivating shovel mounted on said second arm, an operating member for raising and lowering said disk and shovel, and means connecting said operating member with said arms whereby said disk and shovel are raised and lowered at differential angular speeds and approximately the same distance from the ground in the actuation of said operating member.

4. In a lister cultivator, the combination of a frame, a wheel support pivotally connected therewith, a supporting wheel journaled on the swinging end of said wheel support, an arm pivotally mounted on said frame for movement about a common axis with said wheel support, a cultivating disk carried by said arm, a second arm movably connected with said frame concentrically with said wheel support, a cultivating shovel carried by said second arm in rear of said cultivating disk, a single operating lever adapted to raise and lower said disk and shovel simultaneously, and means connecting said lever with said arms whereby said disk and shovel are raised and lowered at differential angular speeds to approximately the same distance relatively to the ground in the actuation of said operating lever.

5. In a lister cultivator, the combination of a frame, a first rocking member pivotally supported on said frame, a wheel support secured to said rocking member, a supporting wheel journaled on the swinging end of said wheel support, an arm extending from said rocking member, a cultivating disk carried by said arm, a second rocking member pivotally connected with said frame for movement concentrically of said first rocking member, a second arm extending from said second rocking member, a cultivating shovel carried by said second arm, an operating lever for actuating both of said rocking members to raise and lower said disk and shovel, and means connecting said lever with said rocking members whereby said disk and shovel are raised and lowered at differential angular speeds in the actuation of said lever.

6. In a lister cultivator, the combination of a frame, a transverse rock shaft pivotally mounted on said frame, a sleeve mounted for axial rocking movement concentrically over said shaft, a pair of standards extending downwardly from said sleeve, a pair of supporting wheels journaled on said standards for traveling on the opposite sides of the plant row, a pair of supporting arms secured to said sleeve and extending rearwardly therefrom, a pair of cultivating disks carried by said arms, a second pair of arms secured to said shaft and extending rearwardly therefrom, a pair of cultivator shovels carried by said second pair of arms and disposed in rear of said disks, an operating lever for raising and lowering said disks and said shovels, and link mechanism transmitting different degrees of rocking movement to said shaft and sleeve in the actuation of said operating lever whereby said shovels are raised and lowered at a different angular speed than said disks and are each substantially the same distance from the ground.

7. In a lister cultivator, the combination of two cultivating tools pivotally mounted for vertical swinging movement about substantially aligned axes, and operating mechanism for raising and lowering said two cultivating tools simultaneously but at different angular speeds whereby said tools are each always substantially the same distance relatively to the ground.

8. In a cultivator of the class described, the combination of a frame, a wheel supporting said frame, rocking members pivotally mounted on said frame on common axes, a pair of relatively movable arms extending from said rocking members, cultivating tools carried by said arms, means for actuating said rocking members to raise and lower said cultivating tools, and means providing for angular adjustment for one of said arms relatively to its rocking member for adjusting the relative cultivating depths of said tools.

9. In a multiple row lister cultivator, the combination of a plurality of cultivator gangs each comprising a gang frame, a supporting wheel therefor, a rock shaft mounted on said frame, a pair of arms carried by said shaft, a pair of cultivating tools secured to said arms, adjusting means for rocking said shaft to raise and lower said cultivating tools, and mechanism for angularly adjusting one of said arms relatively to said rock shaft for establishing different cultivating depth adjustments between said tools, said mechanism comprising releasable means for clamping said latter arm to said rock shaft, a crank member extending from said shaft, and a link connected between said crank member and said arm and adapted to have its effective length adjusted for establishing and maintaining the different angular adjustments of said arm relatively to said rock shaft.

10. In a lister cultivator, the combination of a frame, a rock shaft pivotally mounted on said frame, a sleeve mounted for axial rocking movement concentrically over said shaft, a pair of arms extending from said sleeve, cultivator disks carried by said arms, a second pair of arms extending from said rock shaft, cultivator shovels carried by said second pair of arms, means for rocking said shaft and sleeve for raising and lowering said disks and shovels, and means for adjusting the angular position of one of said latter arms relatively to said rock shaft for adjusting the relative cultivating depths between said shovels.

11. In a three-row lister cultivator, the combination of three lister cultivator gangs each comprising a wheel support and cultivating devices carried thereby, a draft bar extending transversely of said three gangs, means flexibly connecting the gangs with said draft bar, and means connecting the intermediate gang with said draft bar for transmitting draft to said intermediate gang, said means comprising means establishing a pivotal connection between the draft bar and the intermediate gang and means contacting with said draft bar laterally of said first means for stabilizing said latter gang.

12. In a three-row lister cultivator, the combination of three lister cultivator gangs each comprising a frame, a supporting wheel therefor, and cultivating devices carried by said frame, a stabilizing bar connected with the two outer gangs, a draft beam flexibly connected with said two outer gangs and having a guide opening therein, and means for transmitting draft from said draft bar to the intermediate gang and coacting with the guide opening in said draft bar to hold said intermediate gang substantially in stable equilibrium.

13. In a three-row lister cultivator, the combination of three lister cultivator gangs, a draft beam extending transversely of said gangs and having a guide opening therein, means connecting the two outer gangs with said draft beam permitting relative transverse shifting movement between said outer gangs, draft means for coupling the intermediate gang with said beam, said means contacting said draft beam at a point spaced laterally from said point of draft coupling and in said opening whereby said intermediate gang receives its stabilizing support from said draft beam.

14. In a three-row lister cultivator, the combination of three lister cultivator gangs each comprising a frame, a supporting wheel therefor and cultivating devices carried by said frame, a draft beam extending transversely of the three gangs, means connecting the two outer gangs with said draft beam permitting relative inward and outward shifting movement between said beam and one of said outer gangs, a draft coupling connecting said beam with the intermediate gang and permitting lateral swinging movement of said intermediate gang relatively to said beam, and a guide opening associated with said draft beam and through which the forward portion of the intermediate gang frame extends, whereby said intermediate gang receives its stabilizing support solely from said draft beam.

15. In a three-row lister cultivator, the combination of three lister cultivator gangs each comprising a frame, wheels supporting the same, and cultivator devices carried by said frames, a stabilizing bar extending transversely between the two outermost gangs, a stabilizing frame associated with each outermost gang frame, each of said stabilizing frames comprising rollers engaging with said stabilizing bar for permitting inward and outward movement of said stabilizing frames along said bar, means pivotally connecting each outermost gang frame with its associated stabilizing frame for horizontal swinging movement, means carried by said stabilizing bar affording a guide opening adjacent to each outermost gang, a stop bar mounted on the frame of each outermost gang and extending through said guide opening for limiting the movement of said gangs relatively to said stabilizing bar, a draft beam extending transversely of said gangs, means connecting the outermost gangs with said draft beam and permitting relative shifting movement between said gangs, means connecting said draft beam with the intermediate gang for transmitting draft thereto and for holding the latter in stable relation, and an operator's seat mounted on said stabilizing bar.

16. In a three-row lister cultivator, the combination of three lister cultivator gangs each comprising a frame, a pair of supporting wheels therefor, and cultivating devices carried by said frame, a stabilizing bar connected with the two outer gangs, a draft bar flexibly connected with said two outer gangs, and means for transmitting draft from said draft bar to the intermediate gang and contacting with said draft bar at points outside the two supporting wheels of said intermediate gang to hold said intermediate gang substantially in stable equilibrium.

17. An implement of the class described comprising, in combination, a frame, two arms pivotally mounted on said frame for vertical swinging movement, cultivating tools one mounted on each arm, certain of said tools on one arm being spaced rearwardly of the tools on the other arm, and operating mechanism for raising and lowering said cultivating tools simultaneously and through substantially the same vertical distance.

18. A lister cultivator comprising a plurality of cultivator gangs, a draft bar extending transversely of said gangs, means flexibly connecting the gangs with the draft bar, stabilizing means connecting the gangs and comprising a bar pivoted to the gangs, and means carried by said last mentioned bar for limiting the pivotal movement of the gangs relative to said stabilizing bar.

19. In a lister cultivator, the combination of a plurality of cultivator gangs each comprising a frame, supporting wheel means therefor, and cultivating devices carried by said frame, a stabilizing bar connected with the gangs, a draft beam flexibly connected with said gangs, and stop means limiting relative movement between the gangs and said stabilizing bar, said stop means including a second bar carried by each of the gangs and bracket means secured to the stabilizing bar and limiting relative movement between said second bar and said stabilizing bar.

20. In a lister cultivator, the combination of a frame, a first rocking member pivotally supported on said frame, a supporting wheel journalled on said member, a second rocking member having a crank portion and being pivotally supported on said frame and concentrically within said first rocking member, an arm extending from said first member, a cultivating disk carried by said arm, a second arm extending from said second rocking member, a cultivating shovel carried by said second arm, an operating lever for actuating both of said rocking members to raise and lower said disk and shovel, and means connecting said lever with said rocking members whereby said disk and shovel are raised and lowered at the same time at different angular speeds so that both the disk and shovel are moved vertically at substantially the same speed.

21. A lister cultivator comprising a plurality of cultivator gangs, a draft bar extending transversely of said gangs, means flexibly connecting the gangs with the draft bar, stabilizing means connecting the gangs and comprising a bar, and stop means comprising a bar on each of the gangs and cooperating means on the stabilizing bar for limiting the pivotal movement of the gangs relative to said stabilizing bar.

22. In a cultivator, the combination of ground engaging tools pivotally mounted on a common center line for vertical swinging movement, and operating mechanism for raising and lowering said tools simultaneously so that the tools are always substantially the same distance relatively to the surface of the ground.

23. In a cultivator, the combination of ground engaging tools pivotally mounted on a common center line for vertical swinging movement, certain of said tools being spaced rearwardly of another tool, and operating mechanism for raising and lowering said tools simultaneously and so that the tools are always substantially the same distance relatively to the surface of the ground.

24. In a cultivator, the combination of ground engaging tools pivotally mounted on a common center line for vertical swinging movement, certain of said tools being spaced rearwardly of another tool, and operating mechanism for raising and lowering said tools simultaneously and so that each of the tools is always raised and lowered through substantially the same vertical distance.

25. A lister cultivator comprising a plurality of cultivator gangs, a draft bar extending transversely of said gangs, mean flexibly connecting the gangs with the draft bar for both angular and transverse linear movement, stabilizing means connecting the gangs and comprising a bar pivoted to the gangs for pivotal movement about a definite axis thereon, and means including cooperating parts carried by the stabilizing bar and the gangs to limit the angular and transverse movement thereof.

26. In a multiple row lister cultivator, the combination of a plurality of cultivator gangs each comprising a gang frame, supporting means therefor, a rock shaft mounted on said frame, sleeve means concentrically mounted on said shaft, a pair of arms, one secured to said shaft and the other secured to said sleeve means, a cultivating tool carried by each of the arms, adjusting means for rocking both the shaft and sleeve means about their common axis to raise and lower said tools, and means for angularly adjusting said one arm relatively to the rock shaft for establishing different cultivating depth adjustment between the tools.

CARL G. STRANDLUND.
JULIUS PETERSON.